United States Patent
Wang (10) Patent No.: US 11,093,128 B2
(45) Date of Patent: Aug. 17, 2021

(54) TOUCH CONTROL SYSTEM AND TOUCH CONTROL METHOD OF DISPLAY SCREEN, AND ELECTRONIC DEVICE

(71) Applicant: BOE Technology Group Co., Ltd., Beijing (CN)

(72) Inventor: Zhicheng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/823,653

(22) Filed: Mar. 19, 2020

(65) Prior Publication Data

US 2021/0096717 A1 Apr. 1, 2021

(30) Foreign Application Priority Data

Sep. 26, 2019 (CN) .......................... 201910918847.0

(51) Int. Cl.
*G06F 3/0488* (2013.01)
*G06F 3/041* (2006.01)

(52) U.S. Cl.
CPC .......... *G06F 3/0488* (2013.01); *G06F 3/0412* (2013.01)

(58) Field of Classification Search
CPC ............................. G06F 3/0488; G06F 3/0412
See application file for complete search history.

(56) References Cited

U.S. PATENT DOCUMENTS

| 2008/0165141 | A1* | 7/2008 | Christie | G06F 3/0482 345/173 |
| 2010/0220900 | A1* | 9/2010 | Orsley | G06F 3/044 382/124 |
| 2011/0050640 | A1* | 3/2011 | Lundback | G06F 3/0488 345/175 |
| 2012/0287083 | A1* | 11/2012 | Chen | G06F 3/042 345/175 |
| 2013/0241890 | A1* | 9/2013 | Sharma | G06F 3/0425 345/175 |
| 2015/0153904 | A1* | 6/2015 | Cheng | G06F 3/0418 345/175 |
| 2015/0309648 | A1* | 10/2015 | Huang | G06F 1/163 345/173 |
| 2017/0228092 | A1* | 8/2017 | Kang | G06F 3/04162 |

\* cited by examiner

*Primary Examiner* — Sejoon Ahn
(74) *Attorney, Agent, or Firm* — Westman, Champlin & Koehler, P.A.

(57) ABSTRACT

The present disclosure proposes a touch control system and a touch control method of a display screen, and an electronic device. The touch control system includes: a plurality of image capture units configured to capture images of capture areas of the display screen respectively to obtain a plurality of frames of images, wherein a collection of the capture areas covers the display screen; a touch control point identification circuit configured to perform image fusion on the plurality of frames of images to obtain a fused image, and identify a touch control point in the fused image to obtain a position of the touch control point in the fused image on the display screen, wherein the fused image covers the display screen; and a controller configured to control the display screen according to the position of the touch control point on the display screen.

9 Claims, 5 Drawing Sheets

TOUCH CONTROL SYSTEM AND TOUCH CONTROL METHOD OF DISPLAY SCREEN, AND ELECTRONIC DEVICE

CROSS-REFERENCE TO RELATED APPLICATION(S)

This application claims priority to Chinese Application No. 201910918847.0, entitled "TOUCH CONTROL SYSTEM AND METHOD OF DISPLAY SCREEN, ELECTRONIC DEVICE AND STORAGE MEDIUM" and filed on Sep. 26, 2019, which is incorporated herein by reference in its entirety.

TECHNICAL FIELD

The present disclosure relates to the field of electronic device technologies, and in particular, to a touch control system and, a touch control method of a display screen, and an electronic device.

BACKGROUND

With the widespread use of electronic devices, more and more electronic devices have implemented human-machine interaction through a touch control display screen. Currently, the mainstream touch control display screens use a sensing layer as a medium to position touch control points for the purpose of touch control identification. However, under special use environments, such as high electromagnetic field environments, the touch sensitivity of the display screen may be greatly reduced due to electromagnetic interference.

SUMMARY

An embodiment in a first aspect of the present disclosure provides a touch control system of a display screen, which includes:

a plurality of image capture units configured to capture images of capture areas of the display screen respectively to obtain a plurality of frames of images, wherein a collection of the capture areas covers the display screen;

a touch control point identification circuit configured to perform image fusion on the plurality of frames of images to obtain a fused image, and identify a touch control point in the fused image to obtain a position of the touch control point in the fused image on the display screen, wherein the fused image covers the display screen; and a controller configured to control the display screen according to the position of the touch control point on the display screen.

As a possible implementation of the present disclosure, the plurality of image capture units correspond to different capture areas of the display screen respectively, and each of the different capture areas c has at least one label point.

As a possible implementation of the present disclosure, the touch control point identification circuit is further configured to obtain a relative position of the touch control point with respect to the label point in the capture area where the touch control point is located, and obtain a position of the touch control point on the display screen according to the position of the label point on the display screen and the relative position of the touch control point with respect to the label point.

As a possible implementation of the present disclosure, the touch control point identification circuit includes:

a touch control action identification circuit configured to obtain a plurality of frames of fused images, generate a motion trajectory of the touch control point according to variation in the positions of the touch control point in the plurality of frames of fused images, and generate a touch control action according to the motion trajectory of the touch control point.

As a possible implementation of the present disclosure, the touch control action identification circuit is further configured to obtain a first fused image and a second fused image of two consecutive frames among the plurality of frames of fused images, and obtain a first position of the touch control point in the first fused image and a second position of the touch control point in the second fused image; and generate a compensated position of the touch control point according to the first position of the touch control point and the second position of the touch control point, wherein the compensated position of the touch control point is used for compensating the motion trajectory.

An embodiment in a second aspect of the present disclosure provides a touch control method of a display screen, which includes:

obtaining a plurality of frames of images by a plurality of image capture units capturing images of corresponding capture areas of the display screen respectively, wherein a collection of the capture areas covers the display screen;

performing image fusion on the plurality of frames of images to obtain a fused image, wherein the fused image covers the display screen;

identifying a touch control point in the fused image to obtain a position of the touch control point in the fused image on the display screen; and controlling the display screen according to the position of the touch control point on the display screen.

An embodiment in a third aspect of the present disclosure provides an electronic device. The electronic device includes a memory, a processor, and a computer program stored on the memory and executable on the processor, wherein the processor, when executing the computer program, performs operations of:

obtaining a plurality of frames of images by a plurality of image capture units capturing images of capture areas of the display screen respectively, wherein a collection of the capture areas covers the display screen;

performing image fusion on the plurality of frames of images to obtain a fused image, wherein the fused image covers the display screen;

identifying a touch control point in the fused image to obtain a position of the touch control point in the fused image on the display screen; and controlling the display screen according to the position of the touch control point on the display screen.

An embodiment in a fourth aspect of the present disclosure provides a computer readable storage medium on which a computer program is stored, wherein the computer program, when executed by a processor, causes the processor to perform the touch control method of the display screen as described in the foregoing embodiments.

BRIEF DESCRIPTION OF THE DRAWINGS

The above and/or additional aspects and advantages of the present disclosure will become apparent and easily understood from the following description of the embodiments in conjunction with the accompanying drawings, in which.

DETAILED DESCRIPTION

Hereinafter, the embodiments of the present disclosure will be described in detail. Examples of the embodiments are shown in the accompanying drawings, wherein the same or similar reference numbers represent the same or similar elements or elements having the same or similar functions throughout the specification. The embodiments described below with reference to the drawings are exemplary, and are intended to explain the present disclosure, but should not be construed as limiting the present disclosure.

A touch control system and a touch control method of a display screen, an electronic device, and a storage medium according to the embodiments of the present disclosure will be described below with reference to the drawings.

In an embodiment of the present disclosure, the touch control system of the display screen may be applied to any electronic device, so that the electronic device may implement a user's touch operation on the display screen.

The electronic device may be a personal computer (PC), a cloud device, or a mobile device, etc. The mobile device may be, for example, a mobile phone, a tablet computer, a personal digital assistant, a wearable device, a vehicle-mounted device, or other hardware devices having various operating systems, touch screens and/or display screens.

Figure 1:
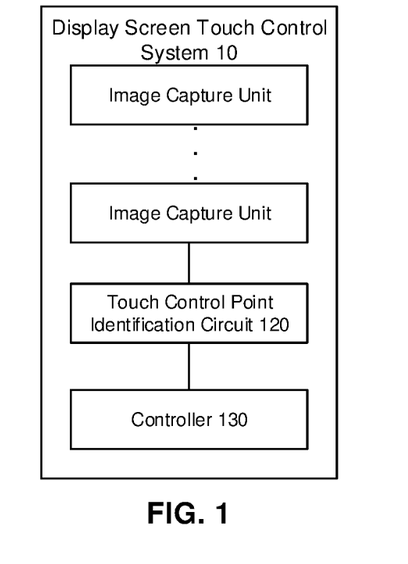
FIG. 1 is a schematic structural diagram of a touch control system of a display screen according to an embodiment of the present disclosure.

FIG. 1 is a schematic structural diagram of a touch control system of a display screen according to an embodiment of the present disclosure.

As shown in FIG. 1, the display touch control system 10 includes: a plurality of image capture units 110, a touch control point identification circuit 120, and a controller 130.

The plurality of image capture units 110 are configured to capture images of the plurality of capture areas in the display screen respectively, wherein a collection of the plurality of capture areas covers the display screen. The touch control point identification circuit 120 is configured to perform image fusion on the plurality of frames of images to obtain a fused image.

In the embodiment of the present disclosure, a plurality of image capture units 110 are provided, the image capture units 110 correspond to different capture areas of the display screen, and each of the different capture areas has at least one label point. After the plurality of image capture units 110 respectively capture images of the corresponding capture areas in the display screen periodically, the plurality of frames of images are obtained. Then, image fusion is performed on the captured plurality of frames of images to obtain the fused image.

Figure 2:
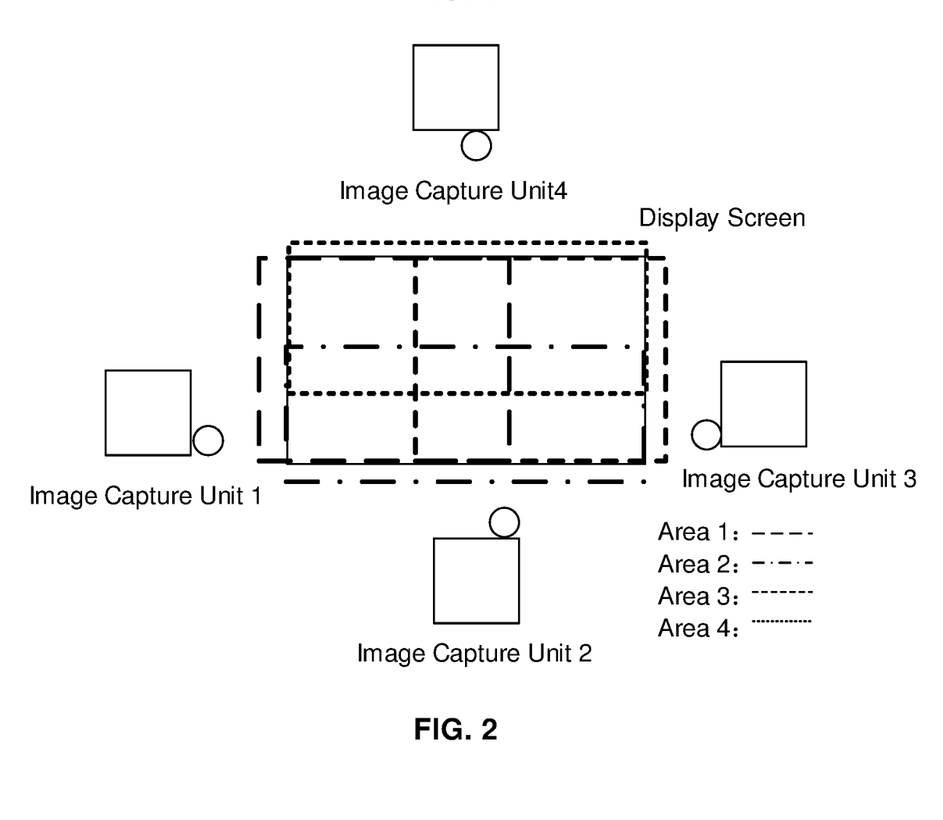
FIG. 2 is a schematic structural diagram of another touch control system of a display screen according to an embodiment of the present disclosure.

As an example, with reference to FIG. 2, the touch control system of the display screen includes four image capture units, the four image capture units corresponding to different capture areas of the display screen respectively, as shown in FIG. 2. Specifically, the image capture unit 1 corresponds to Capture Area 1 of the display screen, and is used to capture an image of Capture Area 1 in the display screen; the image capture unit 2 corresponds to Capture Area 2 of the display screen, and is used to capture an image of Capture Area 2 in the display screen; the image capture unit 3 corresponds to Capture Area 3 of the display screen, and is used to capture an image of Capture Area 3 in the display screen; and the image capture unit 4 corresponds to Capture Area 4 of the display screen, and is used to capture an image of Capture Area 4 in the display screen. In addition, the collection of the capture areas corresponding to the four image capture units covers the entire display screen. Therefore, after the four image capture units capture images of the corresponding four capture areas in the display screen simultaneously, four frames of images are obtained; and image fusion is performed on the captured four frames of images, to obtain a complete fused image. The fused image also covers the entire display screen, thereby ensuring the integrity of the captured image, and solving the technical problem of the conventional technical solutions that the display screen is shielded and thus the entire image of the display screen cannot be captured.

In addition, as shown in FIG. 2, each of the different capture areas of the display screen corresponding to the respective one of the four image capture units has a label point. In a case where the image capture units capture a plurality of frames of images of the corresponding capture areas of the display screen, each image has a label point. Thus, the images are fused according to the label points in the respective images to obtain a complete image of the display screen. As such, the technical problem of incomplete image capture due to the display screen being shielded may be avoided.

The touch control point identification circuit 120 is also configured to identify a touch control point in the fused image to obtain a position of the touch control point in the fused image.

In the embodiment of the present disclosure, when the user performs a touch control operation on the display screen, after image capture is performed by the plurality of image capture units on the plurality of capture areas in the display screen, the touch control point identification circuit 120 performs the image fusion on the captured plurality of frames of images to obtain the fused image, and identifies a touch control point in the fused image to obtain coordinate values of the touch control points in the fused image on the display screen, thereby obtaining the positions corresponding to the touch control point after the user touches the display screen.

As a possible implementation, the touch control point identification circuit 120 first obtains a relative position of a touch control point with respect to a label point in a capture area where the touch control point is located, and obtains a position of the touch control point on the display screen according to the position of the label point on the display screen and the relative position of the touch control point with respect to the label point.

The controller 130 is configured to control the display screen according to the positions of the touch control points on the display screen.

In the embodiment of the present disclosure, after the touch control point identification circuit 120 identifies the fused image and obtains the positions of the touch control point in the fused image on the display screen, the controller 130 controls the display screen according to the position of the touch control point on the display screen.

The touch control system of the display screen in the embodiment of the present disclosure captures the images of the display areas in the display screen respectively by the plurality of image capture units to obtain the plurality of frames of images; performs image fusion on the plurality of frames of images by the touch control point identification circuit to obtain the fused image, and further identifies a touch control point in the fused image by the touch control point identification circuit to obtain the position of the touch control point in the fused image on the display screen; and finally controls by the controller according to the position of the touch control point on the display screen. As such, the plurality of frames of images of the display screen are captured by the plurality of image capture units, the plurality of frames of the image are fused to obtain the fused image, and the position of the touch control point in the fused image on the display screen is identified, which solves the technical problem of a lower touch control sensitivity of the display screen in a high electromagnetic field, and also avoids the technical problem of incomplete image capture when the display screen is shielded, thereby improving the touch control sensitivity of the display screen.

Figure 3:
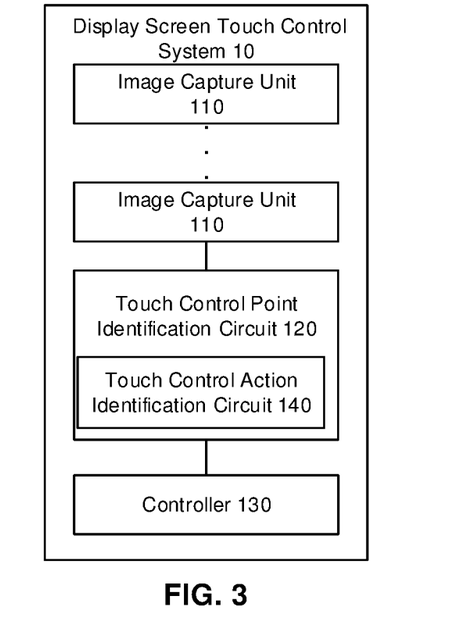
FIG. 3 is a schematic structural diagram of yet another touch control system for a display screen according to an embodiment of the present disclosure.

Based on the above embodiment, referring to FIG. 3, in the touch control system 10 of the display screen, the touch control point identification circuit 120 may include a touch control action identification circuit 140.

The touch control action identification circuit 140 is configured to obtain a plurality of frames of fused images captured by the plurality of image capture units, generate a motion trajectory of a touch control point according to variation in the positions of the touch control point in the plurality of frames of fused images, and generate a touch control action according to the motion trajectory of the touch control point.

Specifically, after the plurality of image capture units capture a plurality of frames of images of the plurality of capture areas in the display screen, image fusion is performed on the captured plurality of frames of images to obtain a fused image. Further, the touch control point identification circuit 120 identifies a touch control point in the fused image to obtain a coordinate position of the touch control point in the fused image. The touch control action identification circuit 140 generates a motion trajectory of the touch control point according to the coordinate positions of the touch control point in the plurality of frames of fused images, so as to generate a touch control action according to the motion trajectory of the touch control point.

Figure 4:
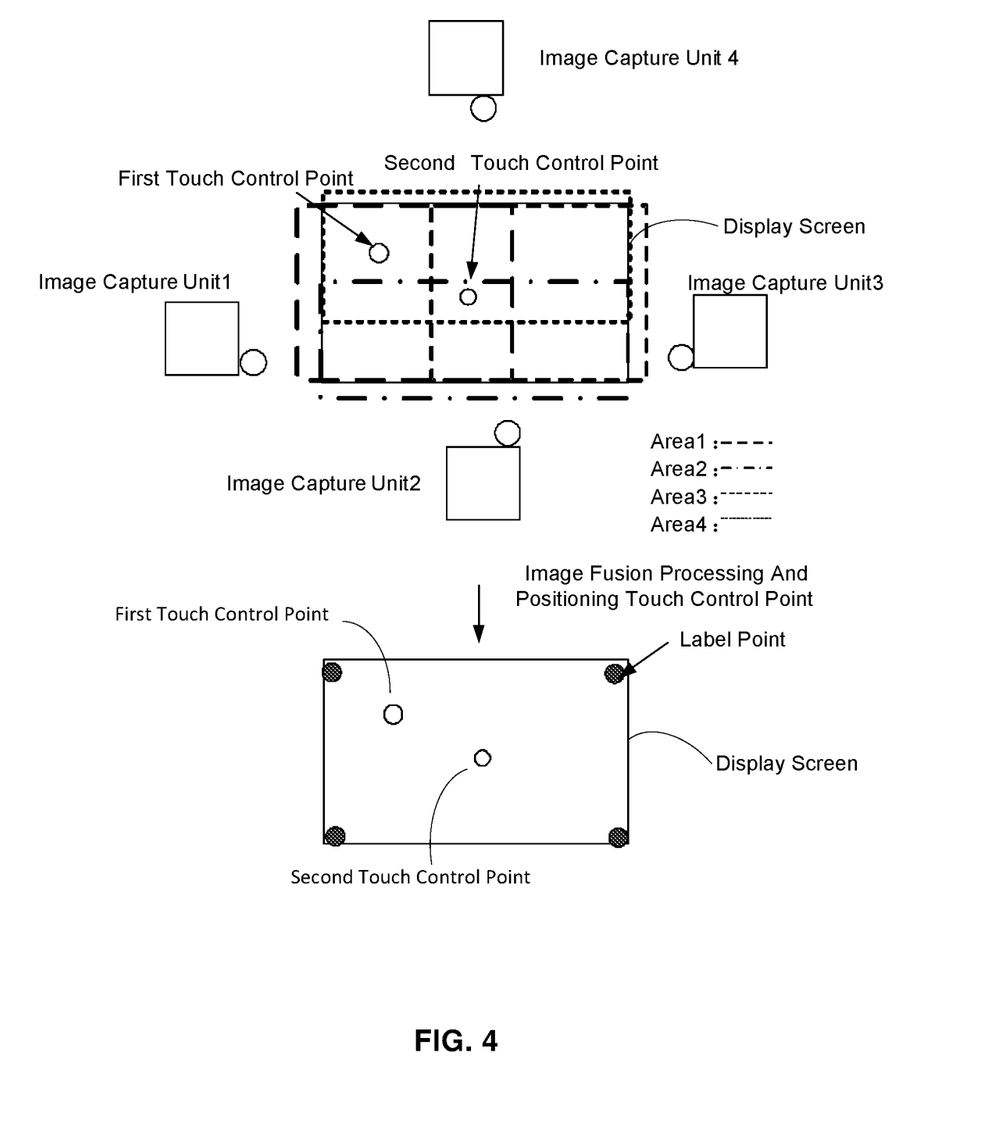
FIG. 4 is a schematic structural diagram of yet still another touch control system of a display screen according to an embodiment of the present disclosure.

As an example, referring to FIG. 4, the plurality of frames of images captured by the image capture units are fused, and the obtained fused image includes coordinate position of the touch control point.

The touch control action identification circuit 140 is further configured to obtain a first fused image and a second fused image of two consecutive frames among the plurality of frames of fused images, obtain a first position of a touch control point in the first fused image and a second position of the touch control point in the second fused image, and generate a compensated position of the touch control point according to the first position of the touch control point and the second position of the touch control point, wherein the compensated position of the touch control point is used for compensating the motion trajectory.

It should be noted that when the user performs a touch control operation on the display screen and his finger moves quickly on the display screen, there may be a case where the touch control point identification circuit 120 cannot fully identify the position of the touch control point in the plurality of frames of images captured by the image capture units due to the fast movement of the finger. In this case, the first fused image and the second fused image of two consecutive frames among the plurality of frames of the fused image are obtained by the touch control action identification circuit 140, and the touch control point identification circuit 120 compares the first fused image and the second fused image to obtain the first position of the touch control point in the first fused image and the second position of the touch control point in the second fused image, so as to generate the compensated position of the touch control point according to the first position of the touch control point and the second position of the touch control point, thereby compensating the motion trajectory according to the compensated position of the touch control point. As such, by compensating the motion trajectory, the entire positioning process of the fast-moving touch control may be completed, thereby improving the sensitivity of the touch control.

Figure 5:
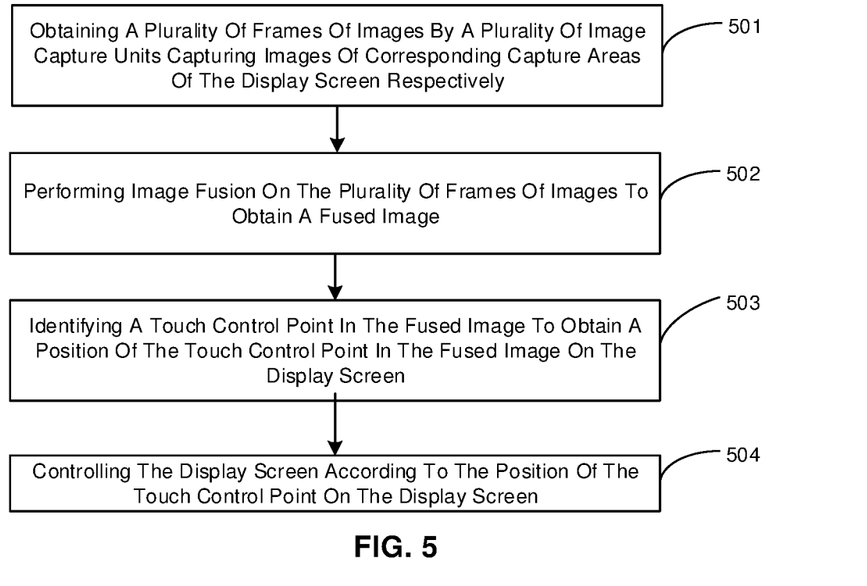
FIG. 5 is a schematic flowchart of a touch control method of a display screen according to an embodiment of the present disclosure.

In order to implement the foregoing embodiments, an embodiment of the present disclosure provides a touch control method of a display screen. FIG. 5 is a schematic flowchart of the touch control method of the display screen according to the embodiment of the present disclosure.

As shown in FIG. 5, the touch control method of the display screen includes Steps 501~504.

In Step 501, images of capture areas of the display screen are respectively captured by a plurality of image capture units to obtain a plurality of frames of images, wherein a collection of the capture areas covers the display screen.

In Step 502, image fusion is performed on the plurality of frames of images to obtain a fused image, wherein the fused image covers the display screen.

In the embodiment of the present disclosure, the touch control system of the display screen is provided with a plurality of image capture units, the image capture units correspond to different capture areas of the display screen respectively, and each of the different capture areas has at least one label point. After the plurality of image capture units respectively capture images of the corresponding capture areas in the display screen periodically, a plurality of frames of images are obtained. Then, image fusion is performed on the captured plurality of frames of images to obtain the fused image.

It should be noted that when the plurality of captured frames of images of the plurality of capture areas in the display screen are fused, the image fusion may be performed on the images to obtain the fused image based on the positions of the label points by using the positions of the label points respectively in the plurality of frames of images as reference points.

It may be understood that when the user performs touch operations on the display screen, the display screen may be shielded. Image capture is performed by the plurality of image capture units on the different capture areas of the display screen to obtain a plurality of frames of images; and further, image fusion is performed on the plurality of frames of images to obtain the fused image. As such, the integrity of the captured images can be ensured, solving the technical problem of the conventional technical solutions that the entire image of the display screen cannot be captured due to the display screen being shielded.

In Step 503, a touch control point in the fused image is identified to obtain a position of the touch control point in the fused image on the display screen.

In the embodiment of the present disclosure, the fused image may be identified by a touch control point identification circuit to obtain a coordinate position of the touch control point on the display screen in the fused image.

As a possible implementation, the touch control point identification circuit obtains a relative position of a touch control point with respect to a label point in a capture area where the touch control point is located, and obtains a position of the touch control point on the display screen according to the position of the label point on the display screen and the relative position of the touch control point with respect to the label point.

In Step 504, the display screen is controlled according to the position of the touch control point on the display screen.

In the embodiment of the present disclosure, after the touch control point in the fused image is identified by the touch control point identification circuit to obtain the position of the touch control point in the fused image on the display screen, the display screen is controlled by the controller according to the position of the touch control point on the display screen.

In the touch control method of the display screen according to the embodiment of the present disclosure, the plurality of image capture units capture a plurality of frames of images of the plurality of capture areas of the display screen, the touch control point identification circuit performs image fusion on the plurality of frames of images to obtain a fused image; further, the touch control point identification circuit identifies a touch control point in the fused image to obtain the position of the touch control point in the fused image on the display screen; and finally, the controller controls the display screen according to the position of the touch control point on the display screen. As such, the plurality of frames of images of the display screen are captured by the plurality of image capture units, the plurality of frames of the image are fused to obtain the fused image, and the position of the touch control point in the fused image on the display screen are identified, which solves the technical problem of a lower touch control sensitivity of the display screen in a high electromagnetic field, and also avoids the technical problem of incomplete image capture when the display screen is shielded, thereby improving the touch control sensitivity of the display screen.

Based on the above embodiment, as a possible situation, prior to controlling according to the position of the touch control point, it is also possible to generate a motion trajectory of a touch control point according to variation in the positions of the touch control point in a plurality of frames of fused images, and to compensate the motion trajectory according to a compensated position of the touch control point, in order to generate a touch control action according to the motion trajectory of the touch control point. Hereinafter, the above process will be described in detail with reference to FIG. 6, which is a schematic flowchart of another touch control method of a display screen according to an embodiment of the present disclosure.

Figure 6:
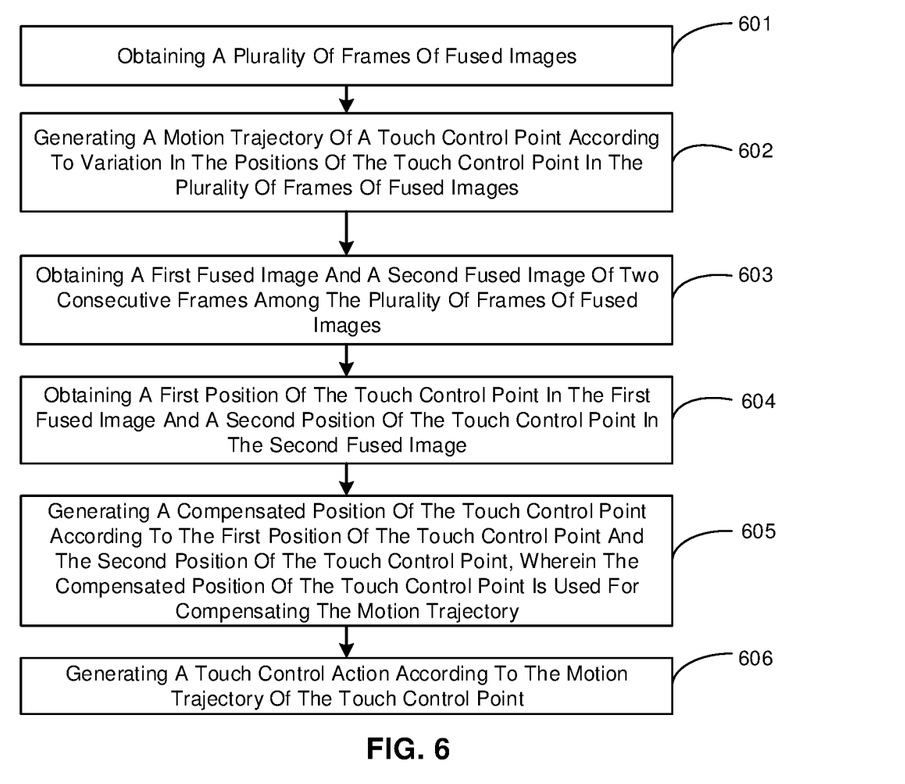
FIG. 6 is a schematic flowchart of another touch control method of a display screen according to an embodiment of the present disclosure.

As shown in FIG. 6, the touch control method of the display screen may further include Steps 601~606.

In Step 601, a plurality of frames of fused images is obtained.

In the embodiment of the present disclosure, after the plurality of image capture units capture images of the corresponding capture areas of the display screen in real time, each image capture unit captures a plurality of frames of images; and the plurality of frames of images captured at the same time are fused to obtain a plurality of frames of fused images.

In Step 602, a motion trajectory of a touch control point is generated according to variation in the positions of the touch control point in the plurality of frames of fused images.

In the embodiment of the present disclosure, after the touch control point identification circuit identifies a touch control point in the fused images to obtain the positions of the touch control point in the plurality of frames of fused images on the display screen, the touch control action identification circuit generates a motion trajectory of the touch control point according to the variation in the positions of the touch control point in the plurality of frames of fused images.

In Step 603, a first fused image and a second fused image of two consecutive frames among the plurality of frames of fused images are obtained.

In the embodiment of the present disclosure, after the plurality of image capture units capture images of the corresponding areas of the display screen, and the captured plurality of frames of images are fused to obtain a plurality of frames of fused images, two consecutive frames of the plurality of frames of fused images are obtained.

It should be noted that in order to facilitate the distinction between the two consecutive frames of fused images, the two consecutive frames of fused images are called a first fused image and a second fused image, respectively.

It needs to be explained that when the user performs a rapid touch control on the display screen, the touch control position may not be included in one frame of fused image which is fused by the plurality of frames of images captured by the plurality of image capture units due to the lower capture rate of the image capture units. Therefore, in the embodiment of the present disclosure, the first fused image and the second fused image of two consecutive frames among the plurality of fused images are obtained.

In Step 604, a first position of the touch control point in the first fused image and a second position of the touch control point in the second image fusion are obtained.

In the embodiment of the present disclosure, after the first fused image and the second fused image are obtained, the touch control points in the first fused image and the second fused image are identified by the touch control point identification circuit to obtain the first position of the touch control point in the first fused image and the second position of the touch control point in the second fused image.

In Step 605, a compensated position of the touch control point is generated according to the first position of the touch control point and the second position of the touch control point, wherein the compensated position of the touch control point is used to compensate the motion trajectory.

In the embodiment of the present disclosure, after the first position of the touch control point in the first fused image and the second position of the touch control point in the second fused image are obtained, the touch control action identification circuit generates the compensated position of the touch control point according to the position variation between the first position of the touch control point and the second position of the touch control point.

The compensated position of the touch control point is located between the first position of the touch control point and the second position of the touch control point, and is used for compensating the motion trajectory of the touch control point.

In Step 606, a touch control action is generated according to the motion trajectory of the touch control point.

In the embodiment of the present disclosure, the touch control action identification circuit generates the motion trajectory of the touch control point according to the variation in positions of the touch control point in the plurality of frames of fused image and the compensated position of the touch control point; then further, generates the touch control action according to the motion trajectory of the touch control point, so as to implement the touch control operation on the display screen.

In the touch control method of the display screen according to the embodiment of the present disclosure, a plurality of frames of fused images is obtained; a motion trajectory of the touch control point is generated according to the variation in positions of the touch control point in the plurality of frames of fused images; the first and the second fused images of two consecutive frames among the plurality of frames of fused images are obtained; the first position of the touch control point in the first fused image and the second position of the touch control point in the second fused image are obtained; a compensated position of the touch control point is generated according to the first position of the touch control point and the second position of the touch control point, wherein the compensated position of the touch control point is used for compensating the motion trajectory; and a touch control action is generated according to the motion trajectory of the touch control point. As such, by compensating the motion trajectory of the touch control point based on the compensated position of the touch control point, it is possible to satisfy more precise touch control requirements, thereby improving the touch control sensitivity of the display screen.

In order to implement the above embodiments, an embodiment of the present disclosure provides an electronic device including a memory, a processor, and a computer program stored in the memory and executable by the processor. When the processor executes the program, the touch control method of the display screen as described in the above embodiments may be implemented.

Specifically, the processor, when executing the program, may perform operations of:

obtaining a plurality of frames of images by a plurality of image capture units capturing images of capture areas of the display screen respectively, wherein a collection of the capture areas covers the display screen;

performing image fusion on the plurality of frames of images to obtain a fused image, wherein the fused image covers the display screen;

identifying a touch control point in the fused image to obtain a position of the touch control point in the fused image on the display screen; and controlling the display screen according to the position of the touch control point on the display screen.

According to an embodiment of the present disclosure, the electronic device may include the plurality of image capture units.

According to an embodiment of the present disclosure, the processor, when executing the program, further performs operations of:

obtaining a relative position of the touch control point with respect to the label point in the capture area where the touch control point is located; and obtaining a position of the touch control point on the display screen according to the position of the label point on the display screen and the relative position of the touch control point with respect to the label point.

According to an embodiment of the present disclosure, the processor, when executing the computer program, further performs operations of:

obtaining a plurality of frames of fused images;

generating a motion trajectory of the touch control point according to variation in the positions of the touch control point in the plurality of frames of fused images; and generating a touch control action according to the motion trajectory of the touch control point.

According to an embodiment of the present disclosure, the processor, when executing the computer program, further performs operations of:

obtaining a first fused image and a second fused image of two consecutive frames among the plurality of frames of fused images;

obtaining a first position of the touch control point in the first fused image and a second position of the touch control point in the second fused image; and generating a compensated position of the touch control point according to the first position of the touch control point and the second position of the touch control point, wherein the compensated position of the touch control point is used for compensating the motion trajectory.

In order to implement the above embodiments, an embodiment of the present disclosure provides a computer readable storage medium on which a computer program is stored. When the program is executed by a processor, the touch control method of the display screen in the above embodiments may be implemented.

In the description of the present disclosure, the description with reference to the terms "one embodiment", "some embodiments", "examples", "specific examples", or "some examples" and the like means that specific features, structures, materials, or characteristics described in conjunction with the embodiments or examples are included in at least one embodiment or example of the present disclosure. In this specification, the schematic expressions of the above terms are not necessarily directed to the same embodiment or example. Moreover, the particular features, structures, materials, or characteristics described may be combined in any suitable manner in any one or more embodiments or examples. In addition, without any contradiction, those skilled in the art may combine and connect different embodiments or examples and features of the different embodiments or examples described in this specification.

In addition, the terms "first" and "second" are used for descriptive purposes only, but cannot be understood as indicating or implying relative importance or implicitly indicating the number of technical features indicated. Therefore, the feature defined with "first" or "second" may explicitly or implicitly includes at least one of such a feature. In the description of the present disclosure, the meaning of "a plurality" is at least two, for example, two, three, etc., unless it is specifically defined otherwise.

Any process or method description in a flowchart or otherwise described herein may be understood as representing a module, fragment, or portion of code that includes one or more executable instructions for implementing steps of a custom logic function or process. And, the scope of the preferred embodiments of the present disclosure includes additional implementations in which the functions may be performed out of the order as shown or discussed, including performing the functions in a substantially simultaneous manner or in the reverse order according to the functions involved, which should be understood by those skilled in the art to which the embodiments of the present disclosure pertain.

Logics and/or steps represented in the flowcharts or otherwise described herein, for example, a sequenced list of executable instructions that may be considered to implement a logical function, may be embodied in any computer readable medium for use by or in combination with an instruction execution system, apparatus, or device, such as a computer-based system, a system including a processor, or other system that may fetch and execute instructions from an instruction execution system, apparatus, or device. For the purpose of this specification, a "computer readable medium" may be any device that may contain, store, communicate, propagate, or transmit a program for use by or in connection with an instruction execution system, apparatus, or device. More specific examples (non-exhaustive list) of computer readable media include: electrical connections (electronic devices) with one or more wirings, portable computer disk enclosures (magnetic devices), random access memory (RAM), read-only memory (ROM), erasable and editable read-only memory (EPROM or flash memory), fiber optic devices, and portable optical disk read-only memory (CDROM). In addition, the computer readable medium may even be paper or other suitable medium on which the program may be printed, for example, by optically scanning the paper or other medium, followed by editing, interpretation, or process in other suitable means if necessary to obtain the program electronically and then store it in the computer memory.

It should be understood that each part of the present disclosure may be implemented by hardware, software, firmware, or a combination thereof. In the above embodiments, a plurality of steps or methods may be implemented by software or firmware stored in a memory and executed by a suitable instruction execution system. For example, if implementation in hardware is identical with another implementation, it may be implemented using any one or a combination of the following techniques known in the art: discrete logic circuits with logic gate circuits for implementing logic functions on data signals, application specific integrated circuits with suitable combined logic gate circuits, programmable gate arrays (PGAs), field programmable gate arrays (FPGAs), etc.

Those of ordinary skill in the art may understand that all or part of the steps carried by the methods in the above embodiments may be implemented by a program instructing related hardware. The program may be stored in a computer readable storage medium. When the program is executed, one or a combination of steps of the method embodiment may be implemented.

In addition, various functional units in respective embodiments of the present disclosure may be integrated into one processing circuit, or may exist separately physically, or two or more of the units may be integrated into one circuit. The above integrated circuit may be implemented in the form of hardware or in the form of software functional circuits. If the integrated circuit is implemented in the form of a software functional circuit and sold or used as an independent product, it may also be stored in a computer readable storage medium.

The aforementioned storage medium may be a read-only memory, a magnetic disk, or an optical disk. Although the embodiments of the present disclosure have been shown and described above, it may be understood that the above embodiments are exemplary and should not be construed as limitations on the present disclosure. Those skilled in the art may understand the above embodiments may be subjected to change, modification, substitution, and modification within the scope of the present disclosure.

I claim:

1. A touch control system of a display screen, comprising:
a plurality of image capture units configured to capture images of capture areas of the display screen respectively to obtain a plurality of frames of images, wherein a collection of the capture areas covers the display screen;
a touch control point identification circuit configured to perform image fusion on the plurality of frames of images to obtain a fused image, and identify a touch control point in the fused image to obtain a position of the touch control point in the fused image on the display screen, wherein the fused image covers the display screen; and
a controller configured to control the display screen according to the position of the touch control point on the display screen;
wherein the touch control point identification circuit comprises:
a touch control action identification circuit configured to obtain a plurality of frames of fused images, generate a motion trajectory of the touch control point according to variation in the positions of the touch control point in the plurality of frames of fused images, and generate a touch control action according to the motion trajectory of the touch control point; and obtain a first fused image and a second fused image of two consecutive frames among the plurality of frames of fused images, obtain a first position of the touch control point in the first fused image and a second position of the touch control point in the second fused image, and generate a compensated position of the touch control point according to the first position of the touch control point and the second position of the touch control point, wherein the compensated position of the touch control point is used for compensating the motion trajectory.

2. The touch control system of the display screen according to claim 1, wherein the plurality of image capture units correspond to different capture areas of the display screen, respectively, and each of the different capture areas has at least one label point.

3. The touch control system of the display screen according to claim 2, wherein the touch control point identification circuit is further configured to obtain a relative position of the touch control point with respect to the label point in the capture area where the touch control point is located, and obtain a position of the touch control point on the display screen according to the position of the label point on the display screen and the relative position of the touch control point with respect to the label point.

4. A touch control method of a display screen, comprising:
obtaining a plurality of frames of images by a plurality of image capture units capturing images of corresponding capture areas of the display screen respectively, wherein a collection of the capture areas covers the display screen;
performing image fusion on the plurality of frames of images to obtain a fused image, wherein the fused image covers the display screen;
identifying a touch control point in the fused image to obtain a position of the touch control point in the fused image on the display screen; and
controlling the display screen according to the position of the touch control point on the display screen;
wherein prior to controlling according to the position of the touch control point, the touch control method further comprises;

obtaining a plurality of frames of fused images;

generating a motion trajectory of the touch control point according to variation in the positions of the touch control point in the plurality of frames of fused images; and generating a touch control action according to the motion trajectory of the touch control point;

obtaining a first fused image and a second fused image of two consecutive frames among the plurality of frames of fused images;

obtaining a first position of a touch control point in the fused image and a second position of the touch control point in the second fused image; and generating a compensated position of the touch control point according to the first position of the touch control point and the second position of the touch control point, wherein the compensated position of the touch control point is used for compensating the motion trajectory.

5. The touch control method of the display screen according to claim 4, wherein the plurality of image capture units correspond to different capture areas of the display screen, respectively, and each of the different capture areas has at least one label point.

6. The touch control method of the display screen according to claim 5, wherein said identifying a touch control point in the fused image to obtain the position of the touch control point in the fused image comprises:

obtaining a relative position of the touch control point with respect to the label point in the capture area where the touch control point is located; and obtaining the position of the touch control point on the display screen according to the position of the label point on the display screen and the relative position of the touch control point with respect to the label point.

7. An electronic device, comprising a memory, a processor, and a computer program stored on the memory and executable by the processor, wherein the processor, when executing the computer program, performs operations of:

obtaining a plurality of frames of images by a plurality of image capture units capturing images of capture areas of the display screen respectively, wherein a collection of the capture areas covers the display screen;

performing image fusion on the plurality of frames of images to obtain a fused image, wherein the fused image covers the display screen;

identifying a touch control point in the fused image to obtain a position of the touch control point in the fused image on the display screen; and controlling the display screen according to the position of the touch control point on the display screen;

wherein the processor, when executing the computer program, further performs operations of;

obtaining a plurality of frames of fused images;

generating a motion trajectory of the touch control point according to variation in the positions of the touch control point in the plurality of frames of fused images; and generating a touch control action according to the motion trajectory of the touch control point, wherein the processor, when executing the computer program, further performs operations of;

obtaining a first fused image and a second fused image of two consecutive frames among the plurality of frames of fused images;

obtaining a first position of the touch control point in the first fused image and a second position of the touch control point in the second fused image; and generating a compensated position of the touch control point according to the first position of the touch control point and the second position of the touch control point, wherein the compensated position of the touch control point is used for compensating the motion trajectory.

8. The electronic device according to claim 7, further comprising the plurality of image capture units.

9. The electronic device according to claim 7, wherein the processor, when executing the computer program, further performs operations of:

obtaining a relative position of the touch control point with respect to the label point in the capture area where the touch control point is located; and obtaining a position of the touch control point on the display screen according to the position of the label point on the display screen and the relative position of the touch control point with respect to the label point.

\* \* \* \* \*